(12) United States Patent
Kaihoko et al.

(10) Patent No.: US 8,068,720 B2
(45) Date of Patent: Nov. 29, 2011

(54) RECORDING DEVICE AND METHOD, REPRODUCTION DEVICE AND METHOD, AND RECORDING MEDIUM

(75) Inventors: Toshiya Kaihoko, Tokyo (JP); Teruhiko Sasaki, Chiba (JP); Motohiro Nishihata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1249 days.

(21) Appl. No.: 10/568,291

(22) PCT Filed: Jul. 8, 2005

(86) PCT No.: PCT/JP2005/012685
§ 371 (c)(1),
(2), (4) Date: Feb. 16, 2006

(87) PCT Pub. No.: WO2006/006536
PCT Pub. Date: Jan. 19, 2006

(65) Prior Publication Data
US 2006/0285825 A1 Dec. 21, 2006

(30) Foreign Application Priority Data
Jul. 12, 2004 (JP) .................. 2004-205143
Jun. 9, 2005 (JP) .................. 2005-169891

(51) Int. Cl.
*H04N 5/92* (2006.01)
*H04N 5/84* (2006.01)
*H04N 5/89* (2006.01)

(52) U.S. Cl. ........ 386/326; 386/330; 386/331; 386/332; 386/334; 386/336

(58) Field of Classification Search .................... 386/68, 386/95, 123–126, 46, 96, 98, 111, 112, 52, 386/55, 326, 330, 331, 332, 334, 336
See application file for complete search history.

(56) References Cited

U.S. PATENT DOCUMENTS

| | | | | |
|---|---|---|---|---|
| 5,479,303 | A | * | 12/1995 | Suzuki et al. ............... 360/72.2 |
| 5,708,637 | A | * | 1/1998 | Umemura et al. ......... 369/47.34 |
| 6,021,250 | A | * | 2/2000 | Hyodo et al. ................ 386/95 |
| 7,305,170 | B2 | * | 12/2007 | Okada et al. ................ 386/68 |

FOREIGN PATENT DOCUMENTS

| | | |
|---|---|---|
| JP | 2000-125259 | 4/2000 |
| JP | 2001-16546 | 1/2001 |
| JP | 2002-290917 | 10/2002 |
| JP | 2002-330402 | 11/2002 |

* cited by examiner

*Primary Examiner* — Thai Tran
*Assistant Examiner* — Daquan Zhao
(74) *Attorney, Agent, or Firm* — Oblon, Spivak, McClelland, Maier & Neustadt, L.L.P.

(57) ABSTRACT

A disc (1) has formed therein a header area (21) in which management information is recorded, and a data area (22) in which content information is recorded. Content information is recorded in units of an access block each including a succession of frames into the data area (22). The leading frame of the access block is taken as a base point of decoding. In the header area (21), there are recorded recording-position information for each access block and output-time information for the leading frame of each access block. At the top of the access block, there are recorded recording-position and output-time information for frames other than the leading frame. Thus, skip reproduction can be done by reading the recording-position and output-time information in the access block into a memory.

5 Claims, 11 Drawing Sheets

RECORDING DEVICE AND METHOD, REPRODUCTION DEVICE AND METHOD, AND RECORDING MEDIUM

TECHNICAL FIELD

The present invention relates to a recording apparatus and method, for recording content data compressed according to MPEG-2 (Moving Picture Experts Group Phase 2) or MPEG-4 to a recording medium, a reproducing apparatus and method, for reading content data from a recording medium, and a recording medium having recorded therein content data compressed according to MPEG-2 or MPEG-4.

This application claims the priority of the Japanese Patent Application No. 2004-205143 filed in the Japanese Patent Office on Jul. 12, 2004 and Japanese Patent Application No. 2005-169891 filed in the Japanese Patent Office on Jun. 9, 2005, the entireties of which are incorporated by reference herein.

BACKGROUND ART

The typical formats for transmitting and recording compressed music and image data (will be referred to as "A content data" hereunder) include the so-called MPEG-2PS (PS: program stream) file format established as ISO/EEC 13818-1 and MPEG-4 file format established as ISO/IEC 14496-1 (will also be referred to as "MP4" hereunder).

In MPEG-2PS, it is required that AV content data, recording position necessary for reading and output of the AV content data, output-time information, etc. (will be referred to as "reference information" hereunder) should be allocated fragmentally and alternately. In MP4, it is required that compressed AV content information and all reference information should be collected and grouped by genre.

Note that when AV content data is recorded to a recording medium according to either or MPEG-2PS or MP4, there arise the following problems.

When MPEG-2PS is used, AV content data and reference information are allocated near each other. Streams recorded in the recording medium should be read sequentially at the normal speed in order to read the AV content data from the recording medium in succession at the normal speed. However, for special modes of reproduction such as fast-forward reproduction, jump reproduction and the like, streams recorded in the recording medium should be read at a high speed and the reference information be analyzed to locate a play-start point or to generate and pre-hold a list of reference information for the special modes of reproduction.

When MP4 is used, reference information on the entire recording medium are collectively recorded in one place. So, the reference information can be read first and held in a memory in a player. Thus, a play-start position can easily be figured out from the information in the memory, and reproduction can be done in special modes such as fast-forward reproduction, jump reproduction and the like than according to MPEG-2PS. However, since reference information is increased with an increased total time for AV content data, the memory should have a larger storage capacity.

Patent document 1:
Japanese Patent No. 3240017
Non-patent document 1:
Home page Hi-MD of the Sony Corporation. [retrieved on Jun. 18, 2004],
Internet <URL:http://www dot sony dot co dot jp/Products/Hi-MD/>

DISCLOSURE OF THE INVENTION

It is therefore desirable to overcome the above-mentioned drawbacks of the related art by providing a recording apparatus and method, a reproducing apparatus and method and a recording medium, in which special modes of reproduction such as fast-forward reproduction, jump reproduction and the like can easily be done and a reference information storing memory having recording-position information, output-time information, etc. stored therein can be used with an improved efficiency.

According to the present invention, there is provided a recording apparatus including, according to the present invention, an encoding means for encoding an input content, a format organizing means for dividing content information resulted from encoding of the input content by the encoding means into access blocks each including a succession of frames and generating management information for the content information, and a writing means for writing the content data in units of an access block into an data area of an recording medium while writing the management information into a management area of the recording medium, the format organizing means generating the access block so that the leading one of the frames of each access block will be a base point of decoding and also recording-position information and output-time information for each frame, and the writing means writing the recording-position information for each access block and output-time information for the leading frame into the management area while writing recording-position information and output-time information for frames other than the leading frame of each access block along with each block into the data area.

According to the present invention, there is also provided a recording medium in which encoded content information is to be recorded, the recording medium including, according to the present invention, a data area in which the content information is recorded in units of an access block each including a succession of frames, and a management area in which management information for the content information is to be recorded, the leading one of the frames of each access block being taken as the base point of decoding, the management area having recorded therein the recording-position information for each access block and output-time information for the leading block of each access block, and the data area having recorded therein the recording-position information for frames other than the leading one and output-time information for the frames other than the leading one along with each access block.

According to the present invention, there is also provided a reproducing apparatus for playing a recording medium having encoded content information recorded therein, the apparatus including, according to the present invention, a reading means for reading data recorded in the recording medium, a storage means for storing management information read from the recording mean, a decoding means for decoding content information read from the recording medium and outputting content, and a controlling means for controlling the reading and outputting of content information, the recording medium including a data area in which content information is recorded in units of an access block including a succession of frames, and a management area in which management information for the content information, the leading frame of the access block being taken as a base point of decoding, recording-position information for each access block and output-time information for the leading block of each access block being recorded in the management area, recording-position information for frames other than the leading one and output-time information for the frames other than the leading one being recorded along with each access block in the data area, the controlling means functioning to read recording-position information for each access block and output-time information for the leading frame of each access block, pre-recorded in the management area, before reading content information recorded in the data area and storing the recording-position information and output-time information into the storage means, identify, for reproducing the leading frame of the access block, the recording position of the reading frame on the basis of recording-position information for the access block and output-time information for the leading frame of each access block, stored in the storage means, and to read, for reproducing a frame other than the leading frame of the access block, recording-position information and output-time information for the object frame from the data area of the recording medium on the basis of recording-position information for an access block including the object frame stored in the storage means to identify the recording position and output time of the object frame on the basis of the read recording-position information and output-time information.

According to the present invention, there is also provided a recording method including, according to the present invention, the steps of encoding an input content, dividing information resulted from encoding of the input content into access blocks each including a succession of frames of which the leading one is taken as a base point of decoding, generating recording-position information and output-time information for each frame, writing the content information in units of an access block into a data area of a recording medium, writing recording-position information for each access block and output-time information for the leading frame into a management area of the recording medium, and writing recording-position information and output-time information for frames other than the leading frame of each access block along with each access block into the data area.

According to the present invention, there is also provided a reproducing method of reproducing content information, in which content information is read from a recording medium and outputted, the recording medium including a data area in which content information is recorded in units of an access block including a succession of frames, and a management area in which management information for the content information, the leading frame of the access block being taken as a base point of decoding, recording-position information for each access block and output-time information for the leading block of each access block being recorded in the management area, recording-position information for frames other than the leading one and output-time information for the frames other than the leading one being recorded along with each access block in the data area, the method including, according to the present invention, the steps of reading recording-position information for each access block and output-time information for the leading frame of each access block, pre-recorded in the management area, before reading content information recorded in the data area and storing the recording-position information and output-time information into a memory, identifying, for reproducing the leading frame of the access block, the recording position of the reading frame on the basis of recording-position information for the access block and output-time information for the leading frame of each access block, stored in the memory, and reading, for reproducing a frame other than the leading frame of the access block, recording-position information and output-time information for the object frame from the data area of the recording medium on the basis of recording-position information for an access block including the object frame stored in the memory to identify the recording position and output time of the object frame on the basis of the read recording-position information and output-time information.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

First Best Mode

The present invention will be described in detail below concerning a disc recorder/player as a first best mode for carrying out the present invention with reference to the accompanying drawings.

(Overall Configuration of the Disc Recorder/Player)

Figure 1:
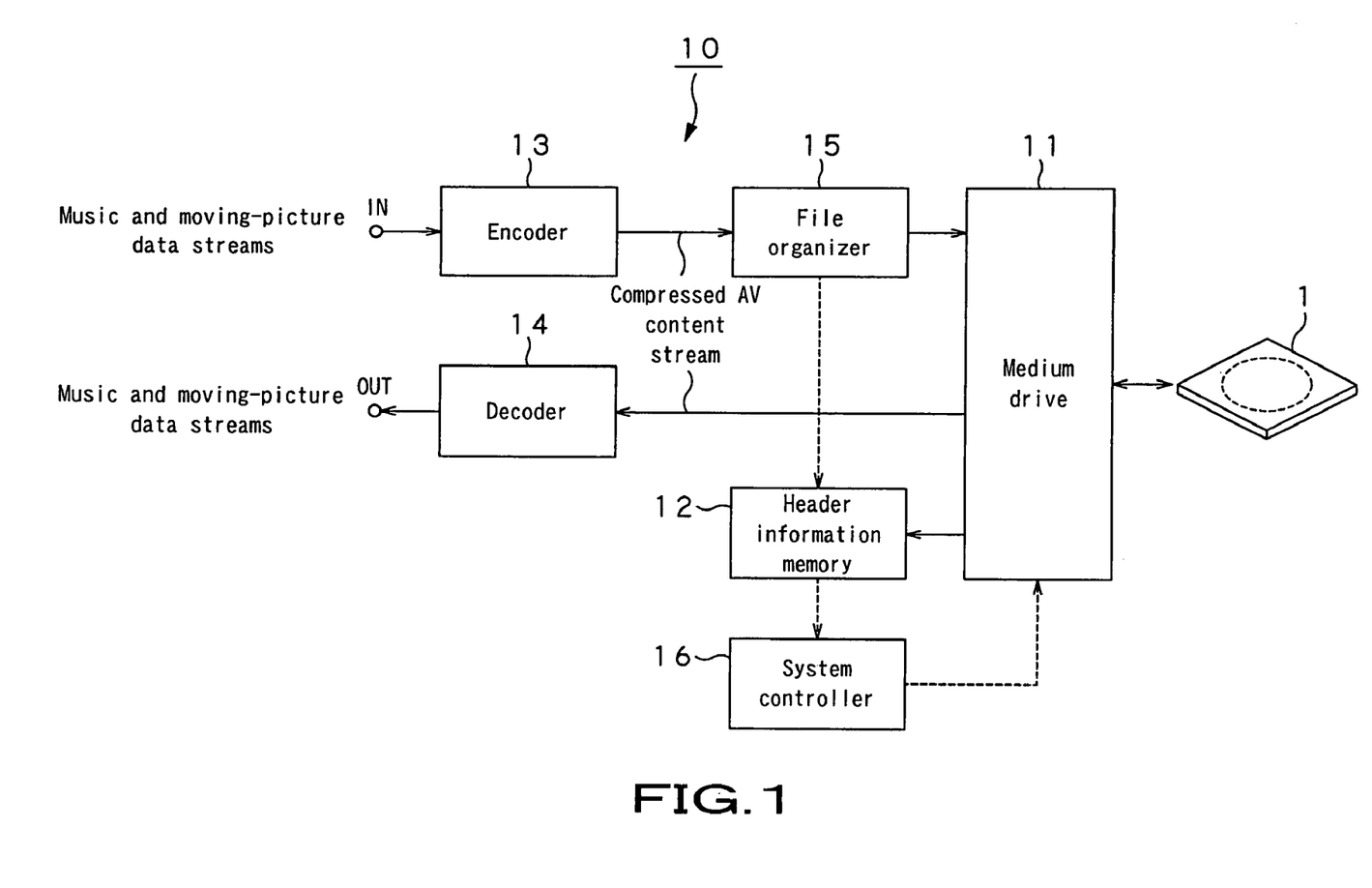
FIG. 1 is a block diagram of a disc recorder/player according to the present invention.

FIG. 1 is a block diagram of the disc recorder/player, generally indicated with a reference numeral 10, as the first best mode for carrying out the present invention.

The disc recorder/player 10 writes and reads data to and from a 6.4-inch magneto-optical disc (will be referred to simply as "disc" hereunder) 1 housed in a cartridge. The disc 1 adopts a format called Hi-MD (registered trade name; refer to the non-patent document No. 2).

The physical specifications of the disc 1 will be described briefly below:

In the disc 1, the recording track pitch is 1.25 μm in, pit length is 0.16 μm/bit, laser wavelength λ is 780 nm in, numerical aperture (NA) of the objective lens is 0.45, disc recording method is such that recording is made along the groove and magnetic domain wall movement is detected detection (DWDD), addressing method is such that both sides of a single-spiral groove is wobbled with a predetermined frequency (22.5 kHz) and an absolute address (ADIP) is FM-modulated to that frequency, modulation method is the RLL1-7PP (Run Length Limited 1-7 Parity Preserve/Prohibit rmtr), error correction method is the RS-LDC (Reed-Solomon Long Distance Code) with BIS (Burst Indicator Subcode), interleaving method is the block-completion method, redundancy is 20.50%, data detecting method is the Viterbi decoding by PR(1, −1)ML, disc driving method is the CLV (Constant Linear Velocity) method, linear velocity is 2.0 m/s, data rate is 9.8 MB/s, recording capacity is 1 GB, and minimum unit of writing is 16 sectors. In the disc 1, data is recorded along the recording track in a direction from the inner to outer radius. Such a disc 1 has the recording capacity thereof improved in the linear-density direction with the magnetic super-resolution technique.

As shown in FIG. 1, the disc recorder/player 10 includes a medium drive 11 to write and read data to and from the disc 1, header information memory 12 to store header information, encoder 13 designed in compliance with, for example, the MPEG-2 (Moving Picture Experts Group Phase 2), MPEG-4 or a similar standard, decoder 14 designed in compliance with, for example, the MPEG-2 (Moving Picture Experts Group Phase 2), MPEG-4 or a similar standard, file organizer 15 to organize a file for data going to be recorded to the disc 1, and a system controller 16 to control the entire disc recorder/player 10.

The disc 1 housed in a cartridge in which it is removably housed is loaded into the medium drive 11. The medium drive 11 writes and reads data to and from the disc 1 loaded therein. The medium drive 11 writes a data output from the file organizer 15 at a designated address on the disc 1 according to a command from the system controller 16. Also, receiving a command from the system controller 16, the medium drive 11 reads data from a designated address on the disc 1 and outputs the data to the decoder 14 and header information memory 12.

The header information memory 12 stores header information in which management information for management of he disc 1 is stated. The header information is recorded in a header area of the disc 1. It is first read after the disc 1 is loaded in the medium drive 11, and stored into the header information memory 12. Also, the header information stored in the header information memory 12 is appropriately written back into the header area of the disc 1 when the content thereof is changed.

The encoder 13 encodes base-band music and moving-picture data streams according to MPEG-2 or MPEG-4, for example, to generate compressed data streams of music and moving picture (will be referred to as "compressed AV content stream" hereunder). The encoder 13 is supplied with music and moving-picture data streams from outside. The music and moving-picture data streams are, for example, base-band data streams resulted from digitization of music and moving-picture signals received by a tuner or the like or read from a recording medium. The compressed AV content stream generated by the encoder 13 is supplied to the file organizer 15.

The decoder 14 decodes compressed AV content stream according to MPEG-2 or MPEG-4, for example, to generate base-band music and moving-picture data streams. The decoder 14 is supplied with a compressed AV content stream read by the medium drive 11 from the disc 1. The decoder 14 supplies music and moving-picture data streams to a monitor and speaker, for example. The monitor displays the supplied music and moving-picture data streams to the user of the disc recorder/player 10. The speaker converts the supplied music and moving image data streams into analog signals and output the analog signals.

The file organizer 15 converts the compressed AV content stream supplied from the encoder 13 into data corresponding to the file format of the disc 1 for recording to the disc 1 via the medium drive 11. More specifically, the file organizer 15 divides the compressed AV content stream in units of an access block to form a file of access blocks. The compressed AV content stream divided in units of an access block by the file organizer 15 is written in units of an access block by the medium drive 11 into the disc 1. At the same time, the file organizer 15 updates header information in the header information memory 12. The header information in the header information memory 12 is written back into the header area of the disc 1 after the compressed AV content stream has completely been recorded.

The system controller 16 controls the entire disc recorder/player 10. Also, when the disc 1 is loaded in the medium driver 11, the system controller 16 instructs the medium drive 11 to read header information and store the header information read by the medium drive 11 into the header information memory 12. The system controller 16 can recognize the recorded condition of the disc 1 in reference to the header information and the disc recorder/player 10 becomes ready for recording and reproduction. At the time of reproduction, the system controller 16 manages the time of frame decoding, output time and the like. Also, given operation commands by the user, the system controller 16 controls a variety of operations of the disc recorder/player 10.

(File Format)

Next, the file format of the disc 1 will be explained with reference to FIGS. 2 and 3.

Figure 2A:
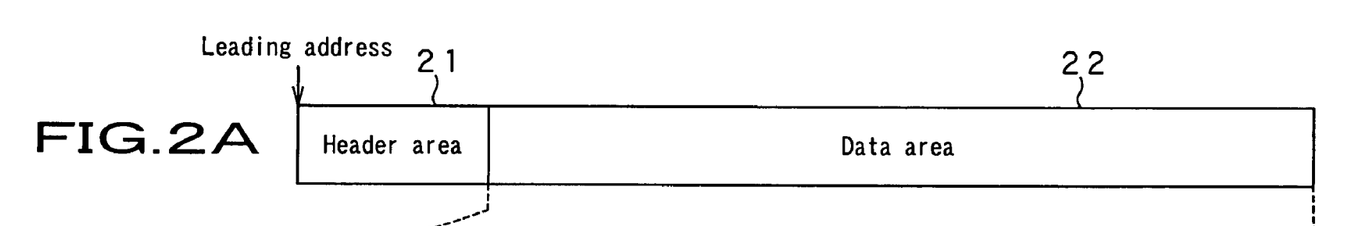
FIGS. 2A to 2D illustrate the structure of a data area formed on a disc.
Figure 3A:
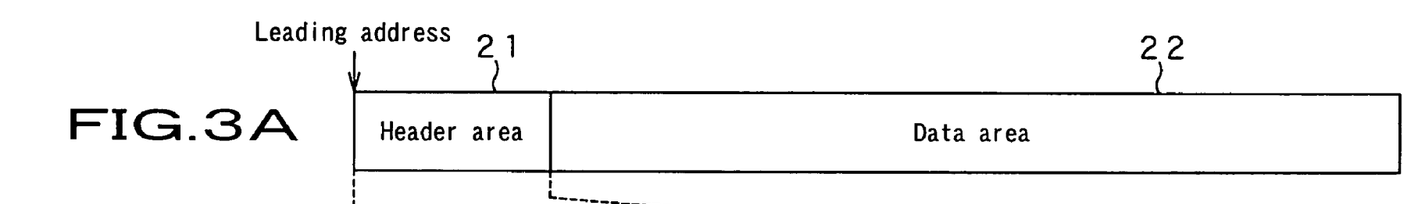
FIGS. 3A to 3D illustrate the structure of a header area formed on the disc.

As shown in FIGS. 2(A) and 3(A), the disc 1 has formed thereon a header area 21 in which header information as management information for the entire disc is recorded and a data area 22. In the header area 21 and data area 22, physical addresses starting with a specific one (leading address, for example) are in succession.

Figure 2B:
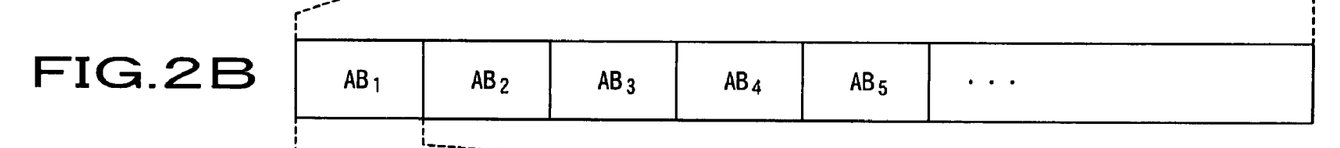

In the data area 22, there is recorded a compressed AV content stream in units of an access block ($AB_1$, $AB_2$, $AB_3$, . . . ) as shown in FIG. 2(B).

The "access block" is a series of data units of a compressed AV content stream including a succession of frames. The access block is decodable independently without reference to information before and after it. That is, the leading frame of an access block is taken as a base point of decoding (intra-frame or intra-picture) which is decodable independently without reference to any other frame. According to MPEG-4, for example, an access block corresponds to GOV (Group Of Video) and the length of one access block is about 0.5 sec. Also, according to MPEG-4, the leading frame of an access block is I-VOP (Intra-Video Object Plane).

Figure 2C:
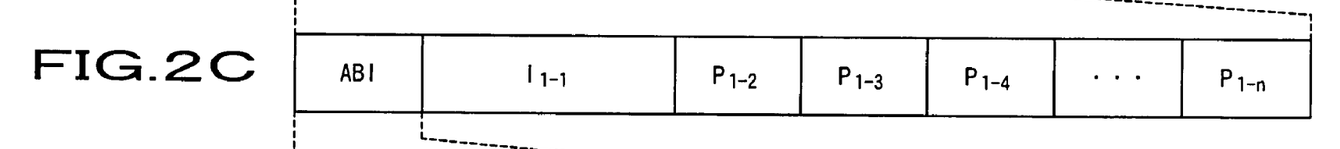

Each access block contains access block information (ABI) in which information in the access block is stated as shown in FIG. 2(C). The access block information is stated at the top of an access block. Also, each access block has frame data as substantial data in each frame stated in areas following the ABI. The frame data has the first to last (n-th) frames of frame data are in the sequence of decoding, for example.

Note that "$I_{1\text{-}1}$" in FIG. 2(C) indicates frame data in the first frame of the first access block and that the frame is an intra-frame. Also, "$P_{1\text{-}2}$" indicates frame data in the second frame of the first access block and that the frame is a nonintra-frame. Also, the top of the frame data includes a header for the frame and the header has stated therein at least an identification of the frame encoding (indicating whether the frame is an intra-frame or a nonintra-frame.

Figure 2D:
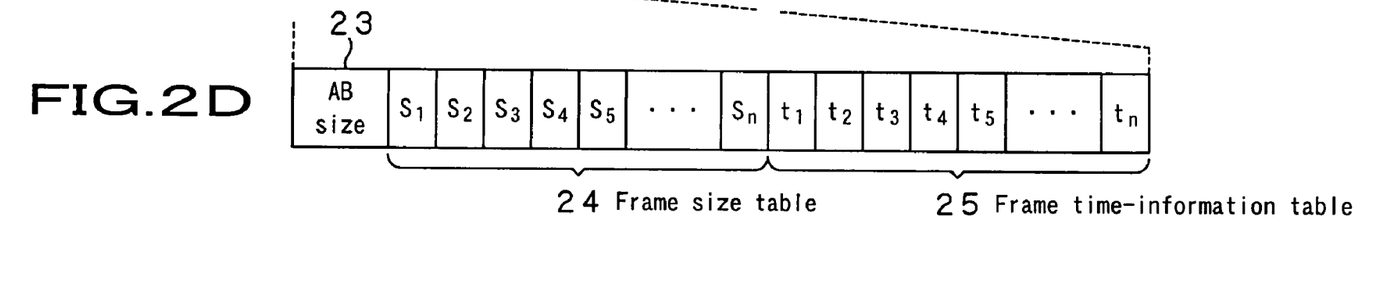

The access block information (ABI) has stated therein a size 23 of the access block, frame size table 24 in which a size of each frame included in the access block is stated and time information table 25 in which time information t (decoding time and output time) for each frame included in the access block is stated, as shown in FIG. 2(D). The access block size 23 is stated at the top of ABI. It should be noted that "$s_n$" in FIG. 2(D) indicates the size of the n-th frame in the access block and "$t_n$" indicates time information for the n-th frame in the access block.

Thus, the disc recorder/player 10 will recognize a recording position, decoding time and output time of a frame included in the access block by reading the access block information (ABI). Since only the size of each frame is recorded in ABI, the disc recorder/player 10 cannot directly recognize the recording position of each frame. However, by adding, to the ABI size, the size information sequentially starting with the size information for the leading frame of the access block, the disc recorder/player 10 can determine the recording position of a frame in an arbitrary position. It should be noted that the leading address of the access block can be recognized from information stated in the header area 21.

Figure 3B:
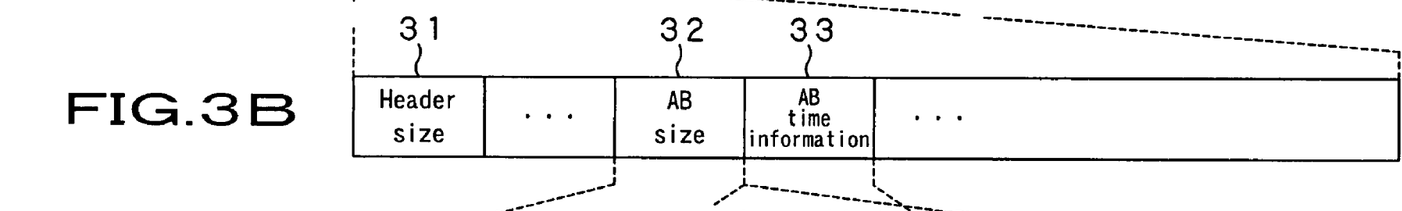

The header area 21 has header information recorded therein as shown in FIG. 3(B). The header information includes a variety of information intended for use to write and read data to and from the disc 1. It has stated therein at least a header size 31, access block size table 32 and access block time information table 33.

The header size 31 has the size of the header area stated therein. The data area 22 is formed contiguous to the header area 21 which is always assigned a predetermined address. Thus, since the header size 31 is stated in the header area 21, the disc recorder/player 10 can recognize the leading address of the data area 22 (in other words, leading address of the first address block).

Figure 3C:
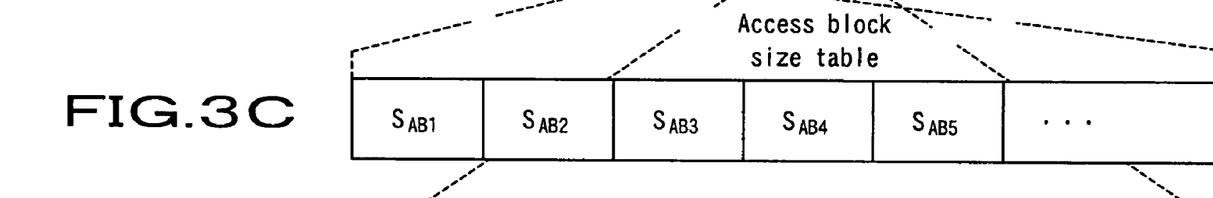

The access block size table 32 has stated therein the data sizes of all the access blocks recorded in the data area 21 as shown in FIG. 3(C).

Thus, the disc recorder/player 10 can recognize the recording position of each address block in reference to the header information. It should be noted that since only the size of each frame is stated in the header information, the disc recorder/player 10 cannot recognize directly the recording position of each frame but can determine the recording position of an access block in an arbitrary position by adding, to the header size 31, access block sizes sequentially starting with the size of the leading access block.

Since the leading address of the access block has its size stated at the top of the access block information, the disc recorder/player 10 can recognize the ABI size of each access block so that it can also recognize the address of the leading frame of each access block. Therefore, the disc recorder/player 10 can directly read the leading intra-frame in each access unit in reference to the header information. It can easily read a specific frame in the special mode of reproduction, for example.

Figure 3D:
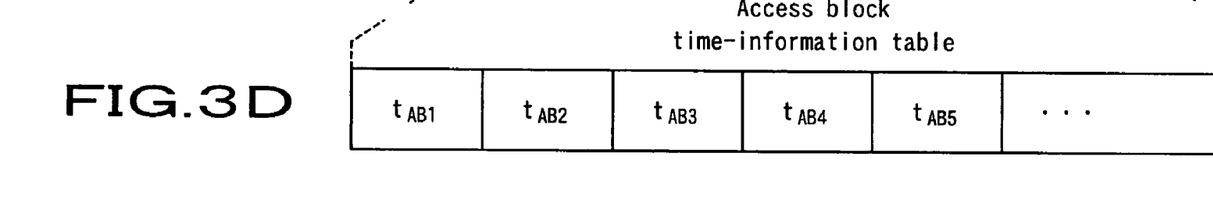

The access block time information data 33 has stated therein time information for the leading frames (always an intra-frame) of all access blocks recorded in the data area 21 as shown in FIG. 3(D).

Thus, the disc recorder/player 10 can also read a frame to be outputted at a specific time in the special mode of reproduction in reference to only the header information. Even when a frame to be outputted at an intended output time has to be read, for example, when a frame to be outputted at an intended time is displayed, when a skip reproduction is done at every predetermined time interval (10 sec, for example) or in a similar case, the disc recorder/player 10 can easily read the frame without having to read all the compressed AV content streams. Also, since time information for all the frames of the compressed AV content stream is stated, the capacity of the management information memory 12 may be smaller.

The disc 1 has the file format having been described above. The file organizer 15 of the disc recorder/player 10 converts input compressed AV content streams into a file format mentioned above for recording to the disc 1, and updates the header information in the header information memory 12.

Note that although description has been made of only the moving-picture data, music data is also recorded in units of a block corresponding to an access block for decoding without reference to any other information and recording position and output time are recorded similarly to the moving-picture data.

(Reproduction Operation)

Next, the procedure for controlling the reproduction operations of the disc recorder/player 10 will be described. The disc recorder/player 10 controls two kinds of operations: Normal mode of reproduction and simple mode of reproduction. In the normal mode of reproduction, a music or moving picture is reproduced on the real-time basis (at the normal speed or double speed). In the simple mode of reproduction, an access block to be reproduced is selected in reference to only the header information and only the leading frame (intra-frame) of the selected access block is reproduced. The simple mode of reproduction is to be used for reproducing a music or moving picture with a skip at every 10 sec, with single-frame advance, at another speed or with a jump to another play-start position. Each of these operations will be described below with reference to a flow diagram in FIG. 4.

Figure 4:
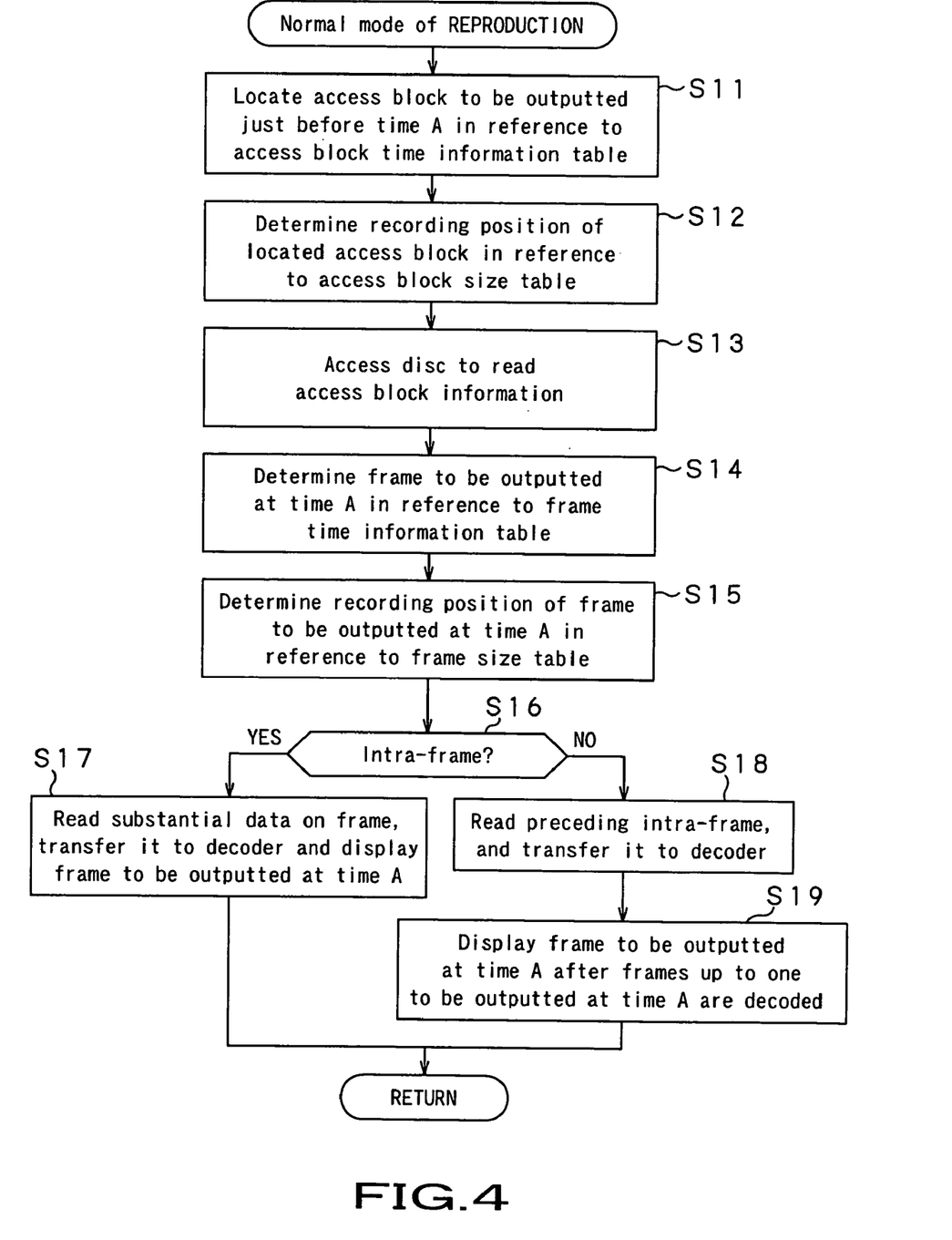
FIG. 4 shows a flow of operations of a system controller when reproducing a frame to be outputted at a time A in the normal mode of reproduction.

A flow of operations made by the system controller 16 for reproducing a frame to be outputted at a time A in the normal mode of reproduction will be explained below with reference to the flow diagram shown in FIG. 4.

In the normal mode of reproduction, the system controller 16 locates an access block to be outputted just before the output time A in reference to the access block time information table 33 included in the header information in the header information memory 12 (in step S11).

Next, the system controller 16 sums up the access block sizes stated in the access block size table 32 included in the header information up to just before the located access block to determine the recording position of the access block (in step S 12).

Then, the system controller 16 accesses the determined recording position on the disc 1 to read access block information stated at the top of the located access block (in step S13).

Next, the system controller 16 locates a frame to be outputted at the output time A in reference to the frame time information table 25 included in the read access block information (in step S14).

Then, the system controller 16 sums up the access block sizes stated in the frame block size table 24 included in the access block information up to just before the located object frame to determine the recording position of the located object frame (in step S15).

Next, the system controller 16 judges which the located object frame is, an intra-frame or nonintra-frame (in step S16).

If the object frame is an intra-frame, the system controller 16 will access a specified recording position on the disc 1, read the object frame and transfer it to the decoder 14. Then, the system controller 16 has the decoder 14 decode the object frame and then displays the decoded frame (in step S17).

If the object frame is a nonintra-frame, the system controller 16 will locate an intra-frame just before the nonintra-frame, reads a compressed AV content stream from the frame, and transfer it to the decoder 14 (in step S18). Then, the system controller 16 has the decoder 14 decode the object frame and displays the decoded object frame (in step S19).

In the above steps S11 to S19, a frame to be outputted at the time A is reproduced in the normal mode of reproduction. For displaying a next frame, the system controller 16 will repeat the above steps S11 to S19.

Figure 5:
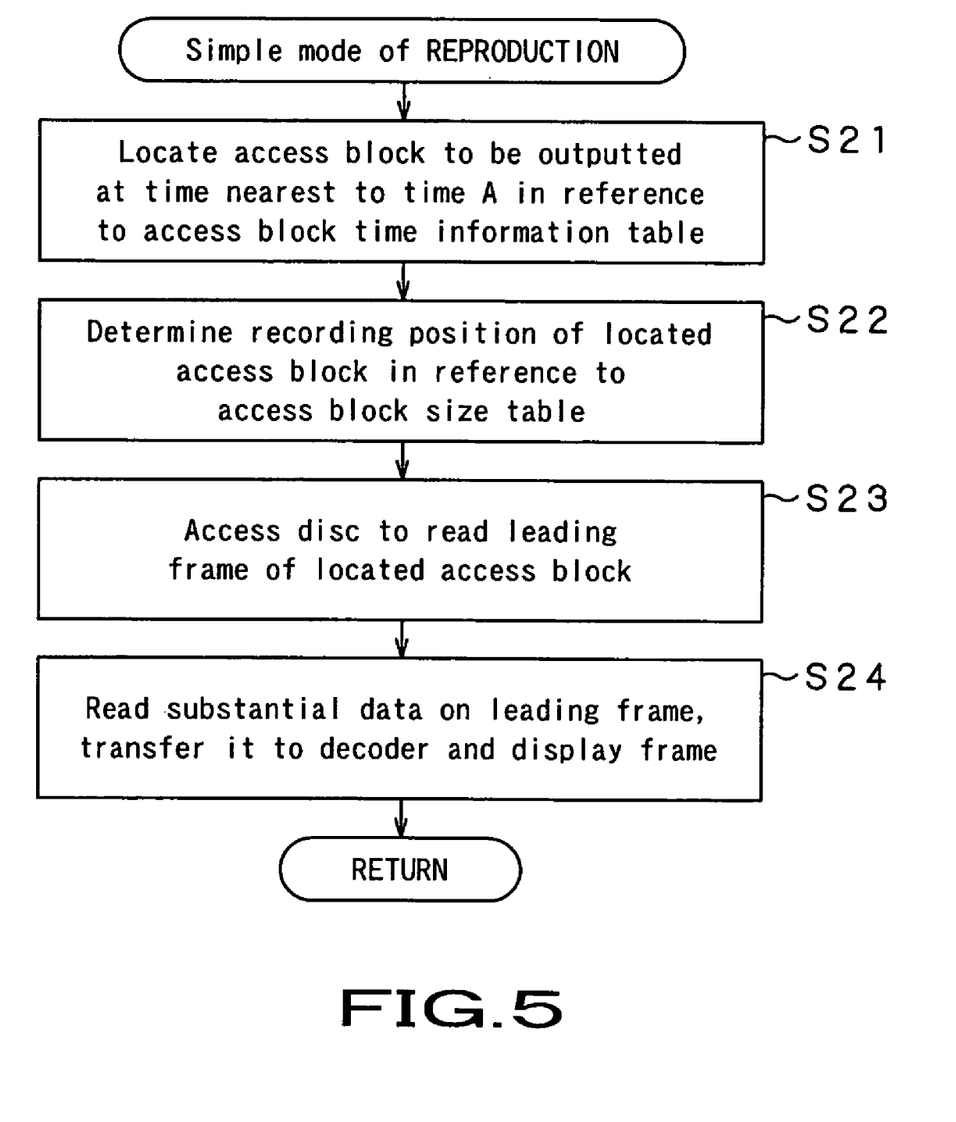
FIG. 5 shows a flow of operations of the system controller when reproducing the frame to be outputted at the time A in the simple mode of reproduction.

Next, a flow of operations made by the system controller 16 for reproducing a frame to be outputted at the time A in the simple mode of reproduction will be explained below with reference to the flow diagram shown in FIG. 5.

In the simple mode of reproduction, the system controller 16 locates an access block to be outputted at a time nearest to the output time A in reference to the access block time information table 33 included in the header information in the header information memory 12 to (in step S21).

Next, the system controller 16 sums up the access block sizes stated in the access block size table 32 included in the header information up to just before the located access block to determine the recording position of the access block (in step S22).

Then, the system controller 16 reads the first frame (intra-frame) of the located access block on the basis of the determined recording position on the disc 1 (in step S23).

Next, the system controller 16 transfers the read frame to the decoder 14 and has the latter decode the object frame and then displays the decoded frame (in step S24).

In the above steps S21 to S24, a frame to be outputted at the time A is reproduced in the simple mode of reproduction. For displaying a next frame, the system controller 16 will repeat the above steps S21 to S124

Since the special mode of reproduction such as skip or jump reproduction needs only research of some extent as mentioned above and thus needs no recording-position information and time information for all the frames, the disc recorder/player 10 should only be able to refer to only the recording-position information and time information for an intra-frame at the top of an access block. On this account, in the disc recorder/player 10, only the recording-time information and time information for a frame at the top of each access block are stored in the header information and the recording-position information and time information for each frame are recorded in the stream. Thus, in the disc recorder/player 10, the information having to be pre-stored in the header information memory 12 may be reduced.

The portable video device holding promise of having a more market share will be limited in memory capacity, but the disc recorder/player 10 according to the present invention will be very effective as such a portable video device. In case the recording medium is a disc that needs a physical movement of a write/read head, depending upon the recording position of data, or from which data can only be read in a wait time depending upon the recording position of data, the disc recorder/player 10 can reproduce the data very efficiently because the change of the play-start point can be reduced.

Note that in the disc recorder/player 10 according to the present invention, only the position of the top of the access block is recorded as header information, which will not limit the functions such as fast forward etc. In case the disc recorder/player 10 has such processing functions as in a stationary device or the like, access block information in the data area can be used to locate a recording position accurately and reproduced data without having to refer to the frame position included in the header information.

Second Best Mode

The present invention will be described in detail below concerning a portable player as a second best mode for carrying out the present invention.

Figure 6:
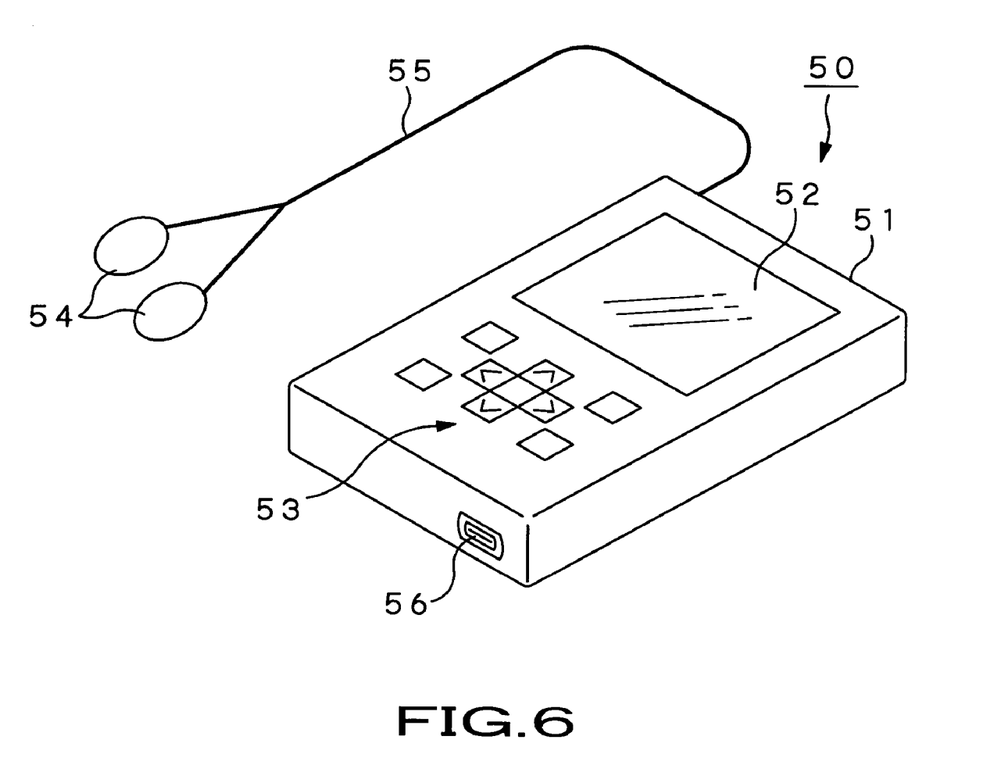
FIG. 6 shows the appearance of a portable player according to the present invention.

FIG. 6 is a perspective view showing the appearance of the portable player, generally indicated with a reference numeral 50, according to the present invention.

The portable player 50 is a device as small as can be carried in one hand. The portable player 50 is a small portable device having built therein a magnetic hard disc as a recording medium and which reads audio data, moving-picture data, etc. from the hard disc and outputs the read data for viewing and listening.

As shown in FIG. 6, the portable player 50 has a body 51 shaped in the general form of a rectangular parallelopiped as a whole. The player body 51 has a display unit 52 provided on the main side thereof. The display unit 52 is formed from, for example, an LCD (liquid crystal display). When audio data recorded in the hard disc is reproduced, the display unit 52 display text data such as title of the audio data being reproduced. When still or moving picture is reproduced, the display unit 52 displays the still or moving picture being reproduced.

Near the display unit 52 (under the display unit 52, for example), of the player body 51, there is provided a control panel 53 to operate the portable player 50. The control panel 53 includes a cross-shaped key formed from pushbuttons, and other buttons. The control panel 53 is used to start and stop reproduction of audio data and moving-picture data or move a cursor being displayed on the display unit 52.

The player body 51 has connected thereto via a cable 55 an earphone 54 which is an electro-acoustic transducer to output audio data as an audible sound.

The player body 51 is provided with a USB (Universal Serial Bus) 56 for connection to a computer. Being connected to a computer via the USB interface 56, the portable player 50 receives audio data, moving-picture data, etc. from the computer and stores in the internal hard disc.

Figure 7:
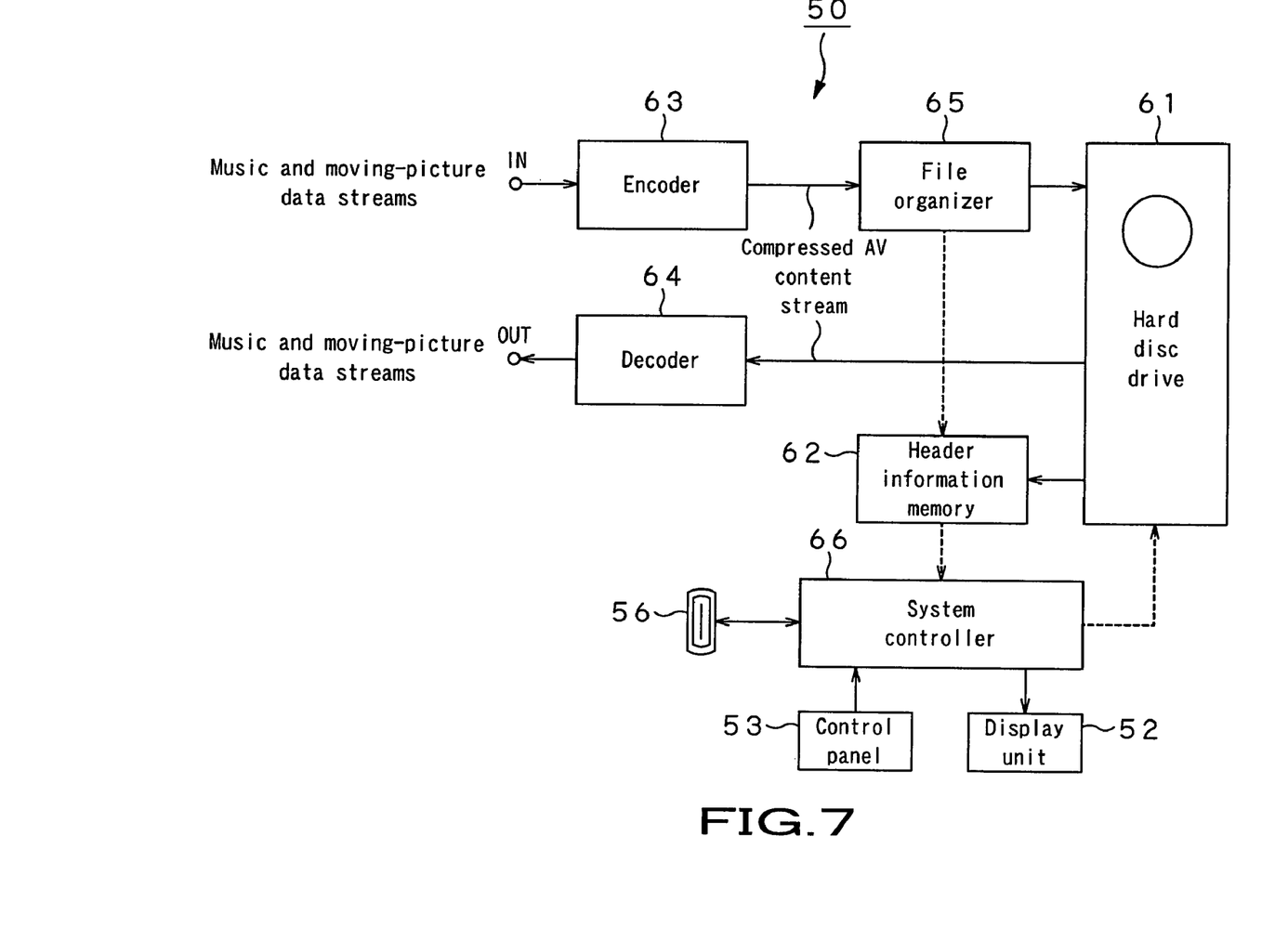
FIG. 7 is a block diagram of the portable player according to the present invention.

FIG. 7 shows the internal construction of the portable player 50.

As shown in FIG. 7, the portable player 50 includes a hard disc drive 61, header information memory 62 to store header information, encoder 63 designed in compliance with, for example, MPEG-2, MPEG-4 or a similar standard, decoder 64 designed in compliance with, for example, MPEG-2, MPEG-4 or a similar standard, file organizer 65 to make a file of data to be recorded to the hard disc, and a system controller 66 to control the entire portable player 50.

The hard disc drive 61 writes and reads data to and from the internal hard disc. The hard disc drive 61 is supplied with a command from the system controller 66 to write data output from the file organizer 65 at a specified address on the hard disc. Also, the hard disc drive 61 is given a command by the system controller 66 to read data from a specified address on the hard disc and output it to the decoder 64 and head information memory 62.

The header information memory 62 is to store header information having stated therein management information for managing the hard disc. The header information is recorded in a header area of the hard disc, and stored in the header information memory 62 after the portable player 50 is put into operation, for example. Also, the header information stored in the header information memory 62 is appropriately rewritten into the header area of the hard disc when having the content thereof updated.

The encoder 63 encodes baseband music data stream and baseband moving-picture data stream according to, for example, MPEG-2 or MPEG-4 to generate compressed music and moving-picture data stream (will be referred to as "compressed AV content stream" hereunder). The encoder 63 is supplied with music and moving-picture data streams from outside. The music and moving-picture data streams are baseband data streams resulted from digitization of music and moving-picture signals received via a tuner or the like or read from a recording medium. The compressed AV content stream generated by the encoder 63 is supplied to the file organizer 65.

The decoder 64 decodes the compressed AV content stream according to, for example, MPEG-2 or MPEG-4 to generate baseband music data stream and base-band moving-picture data stream. The decoder 64 is supplied with a compressed AV content stream read by the hard disc drive 61 from the head disc. The decoder 64 supplies the music and moving-picture data streams to, for example, the speaker and monitor. The monitor displays the supplied music and moving-picture data streams to the user. The speaker converts the supplied music and moving-picture data streams into analog signals and outputs them.

The file organizer 65 converts the compressed AV content stream output from the encoder 63 into a format conforming to a file format of the hard disc for recording by the hard disc drive 61 to the hard disc. More specifically, the file organizer 65 divides the compressed AV constant stream in units of an access block into files. The compressed AV content stream divided by the file organizer 65 in units of an access block is written by the hard disc drive 61 in units of the access block to the hard disc. At the same time, the file organizer 65 updates the header information in the header information memory 62. The header information in the header information memory 62 is rewritten into the header area of the hard disc after the compressed AV content stream is completely recorded.

The system controller 66 controls the entire portable player 50. Also, after the portable player 50 is put into operation, the system controller 66 instructs the hard disc drive 61 to read the header information and stores the header information read by the hard disc drive 61 into the header information memory 62. Referring to this header information, the system controller 66 can recognize the recording state of the hard disc and gets ready for writing or reading. Also, the system controller 66 makes decoding time management, output time management of a frame at the time of reproduction. The system controller 66 accepts user's commands to make a variety of control operations.

Further, the system controller 66 controls the display unit 52, control panel 53, earphone 54, USB interface 56, etc.

(File Format)

Next, the file format of the hard disc will be explained.

For write and read of content data such as audio and vide data, etc., the hard disc is managed by a FAT (File Allocation Table) system as a file management system using a table for management of addresses of files on the disc.

Figure 8:
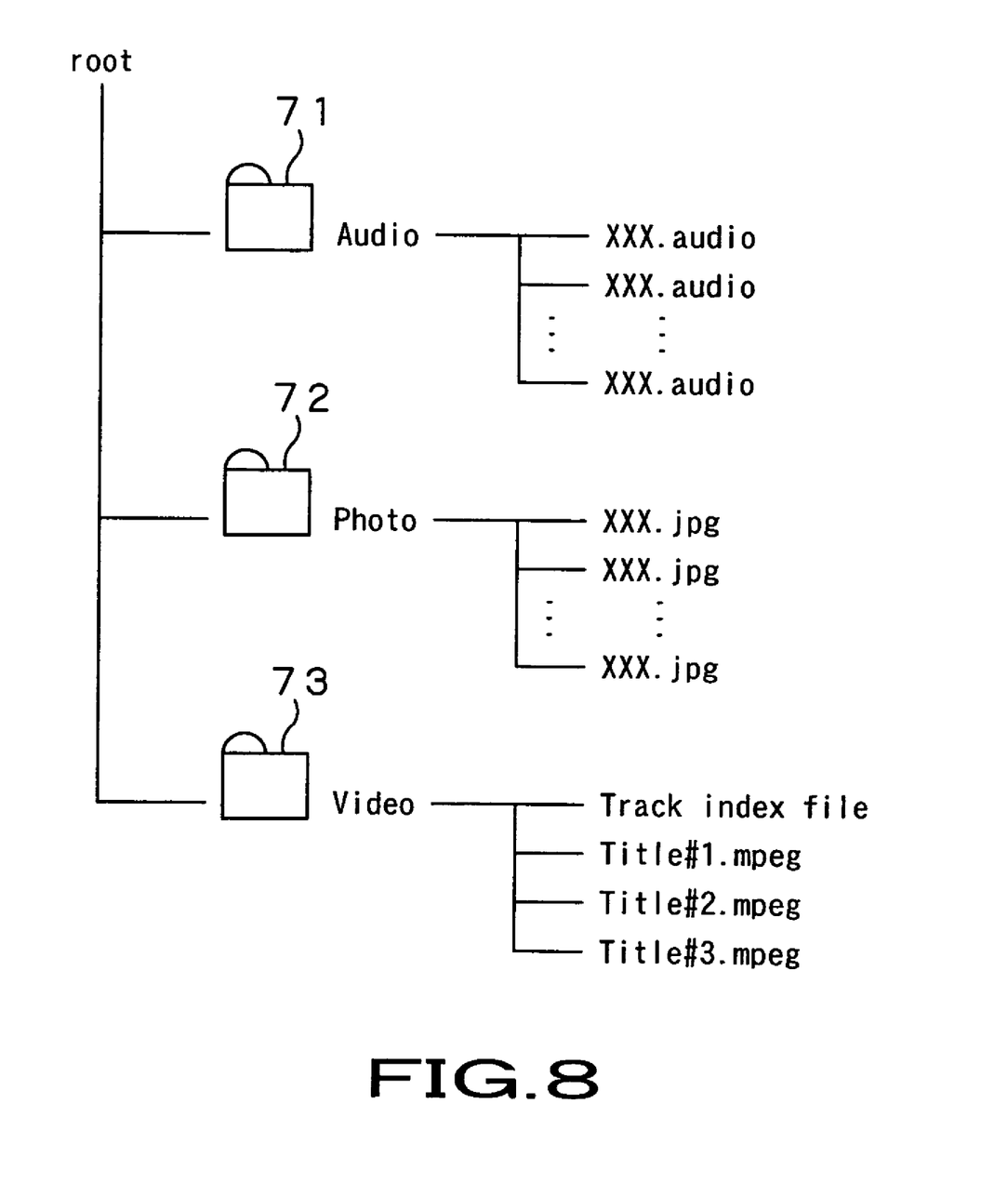
FIG. 8 shows a management system for files stored in a hard disc.

In the hard disc, there are formed, under a root directory, an audio file folder 71, still picture data folder 72 and a moving-picture data folder 73 as shown in FIG. 8. Each folder stores a single content or a plurality of contents.

Next, the format of the moving-picture data will be explained with reference to FIG. 9.

Figure 9A:
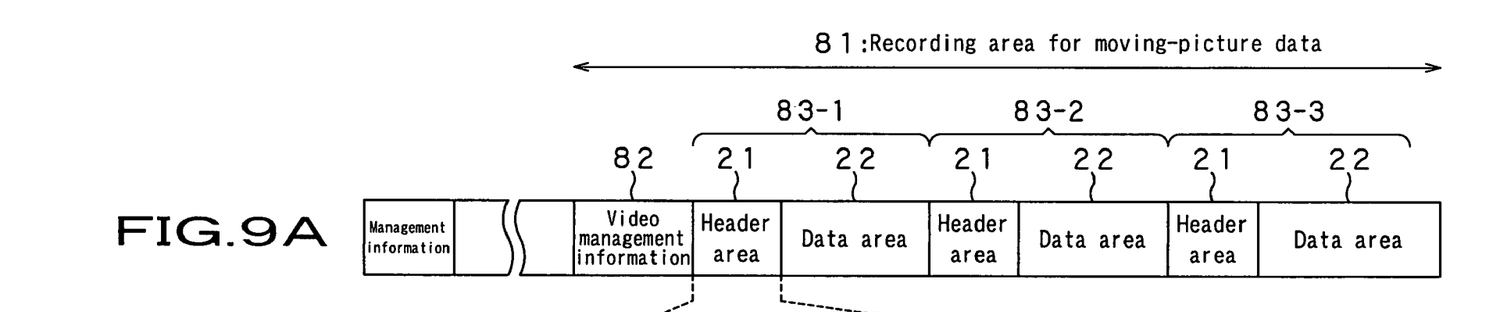
FIGS. 9A to 9D illustrate the structure of a data area formed on the hard disc.

The hard disc has formed therein a recording area for moving-picture data as shown in FIG. 9A. The moving-picture data recording area 81 may be a physically continuous or not-continuous area so long as it is managed at last according to management information for the entire hard disc.

The moving-picture data recording area 81 has formed therein a video management information area 82 and content recording areas 83 (83-1, 83-2 and 83-3) as many as recorded contents. Three content recording areas 83 are shown herein, but the number of the areas 83 may be any other one, not limited to three.

Each of the content recording areas 83 has formed therein a header area 21 in which header information as management information for each content is recorded and a data area 22. Each of the header area 21 and data area 22 includes a succession of physical addresses starting with a predetermined physical address managed under the video management information 82.

Figure 9B:
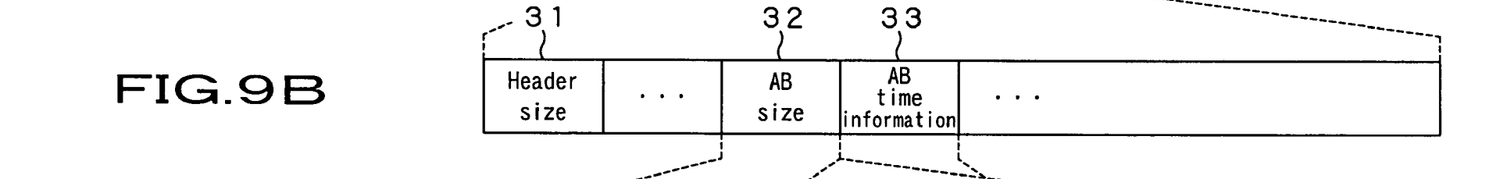
Figure 9C:
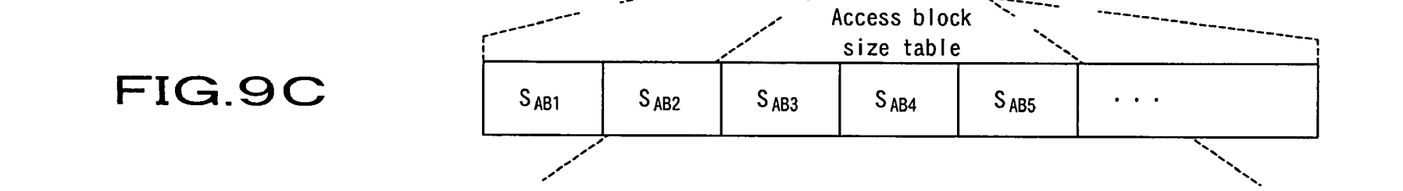
Figure 9D:
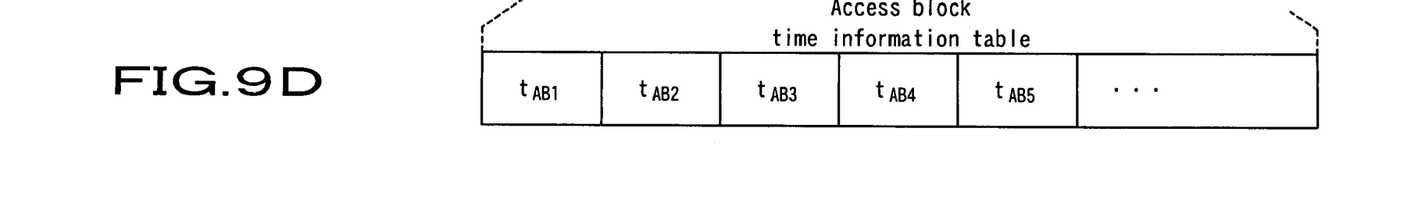

The header area 21 has the same content as in the first best mode stated therein. The configuration of the data area 22 is the same as that in the first best mode as shown in FIGS. 9(B), 9(C) and 9(D).

Thus, even if a plurality of moving-picture contents is stored in the hard disc, the portable player 50 can make a selection of an access block to be reproduced in reference to only its header information and make operations to reproduce only the leading frame (intra-frame) of the access block thus selected as in the first best mode. That is, the portable player 50 can reproduce each of the plurality of moving-picture contents in two modes, namely, in the normal mode of reproduction and simple mode of reproduction.

Figure 10:
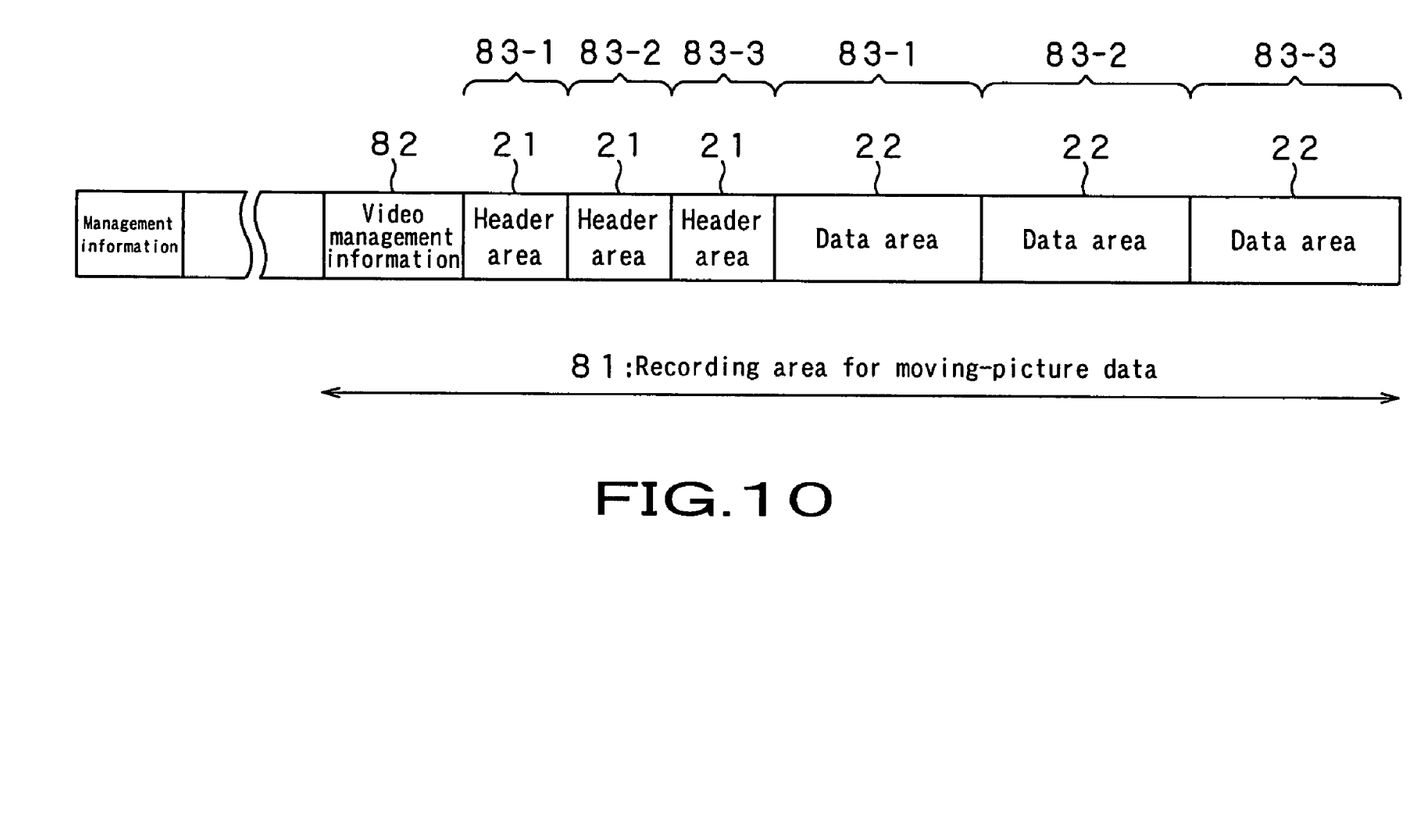
FIG. 10 illustrates the structure of a data area of another structure, formed on the hard disc.

Note that although in the example shown in FIG. 9, each of the content recording area 83 includes a header area 21 and data area 22, the moving-picture data recording area 81 is not limited to this format but may be formed to have a format as shown in FIG. 10. That is, the moving-picture data recording area 81 may be formed to have all the header information 22 collectively laid in the leading portion thereof.

Also, each of the header information 22 may include a moving-picture thumbnail data in each of the compressed AV content stream.

Figure 11:
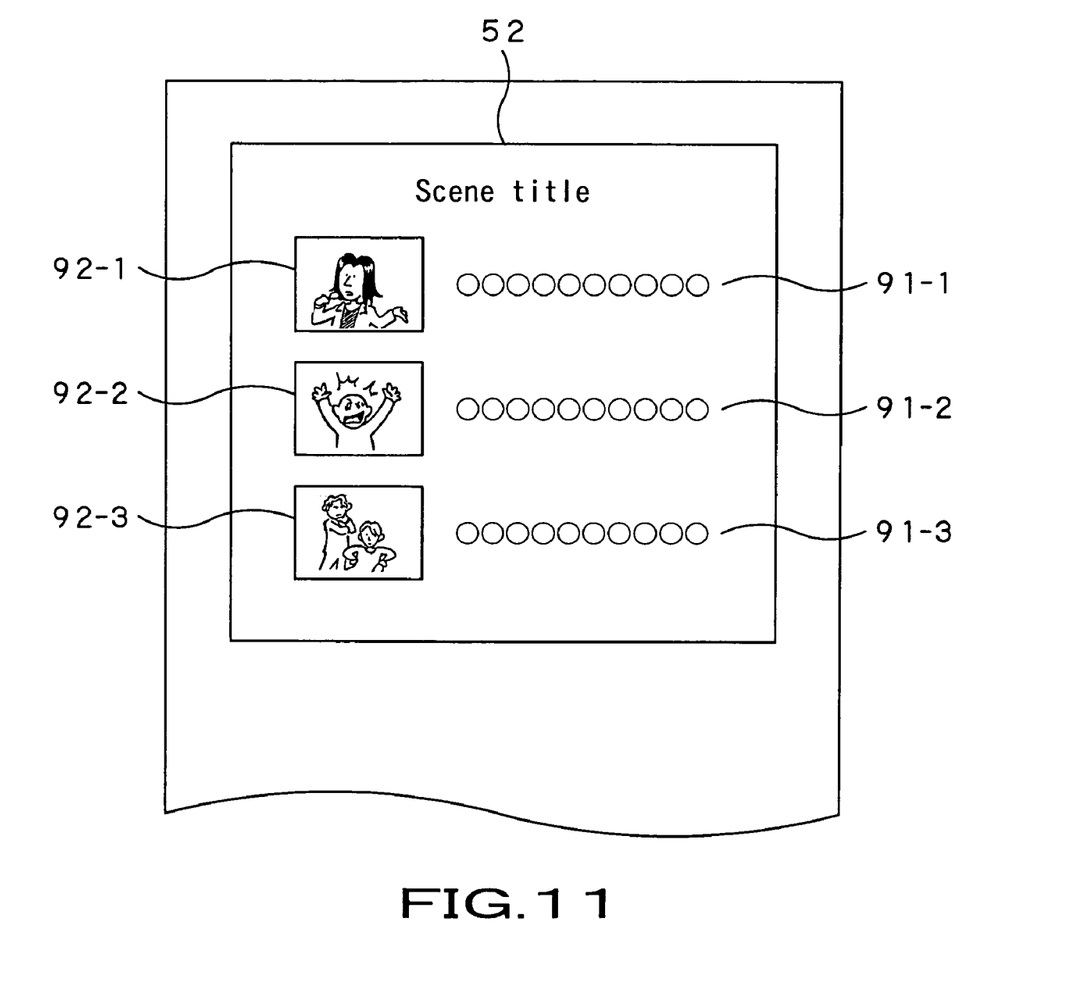
FIG. 11 illustrates a display unit on which thumbnail data on moving pictures are displayed.

The moving-picture thumbnail data is indexing data of some seconds, resulted from spatial reduction in image size of the access block. When displaying a list of scenes of a content, moving-thumbnail images 92 (92-1, 92-2 and 92-3) are displayed with respect to statements 91 (91-1, 91-2 and 91-3) of scene names, respectively, as shown in FIG. 11. Namely, the moving-picture thumbnail data can be used to help the user for searching a desired one of the scenes.

The above moving-picture thumbnail images 92 (92-1, 92-2 and 92-3) can be included in the header information 22, which will make it easy to control the display of the moving-picture thumbnail images.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A recording apparatus comprising:
  encoding means for encoding an input content;
  format organizing means for dividing content information resulted from encoding of the input content by the encoding means into access blocks each including a succession of frames and generating header information for the content information; and
  writing means for writing the content data in units of an access block into a contiguous data area of a recording medium while writing the header information into a contiguous header area of the recording medium, the format organizing means generates the access block so that a leading one of the frames of each access block is a base point of decoding subsequent frames, and also generates (1) access block size information for each access block and an output-time for a leading frame, and (2) a size information and output-time information for frames other than the leading frame; and the writing means writes the access block size information for each access block and the output-time information for the leading frame into the header area, and writes the size information and the output-time information for the frames other than the leading frame of each access block along with each access block into the data area.

2. A non-transitory recording medium in which encoded content information is to be recorded, the recording medium including:
   a contiguous data area in which the content information is recorded in units of an access block each including a succession of frames; and
   a contiguous header area in which header information for the content information is to be recorded,
   the leading one of the frames of each access block being taken as the base point of decoding subsequent frames,
   the header area having recorded therein access block size information for each access block and output-time information for the leading frame of each access block, and
   the data area having recorded therein size information for frames other than the leading frame and output-time information for the frames other than the leading frame along with each access block.

3. A reproducing apparatus for playing a recording medium having encoded content information recorded therein, the apparatus comprising:
   reading means for reading data recorded in the recording medium;
   storage means for storing header information read from the recording medium;
   decoding means for decoding content information read from the recording medium and outputting content; and
   controlling means for controlling the reading and outputting of content information,
   the recording medium including a contiguous data area in which content information is recorded in units of an access block including a succession of frames, and a contiguous header area in which header information for the content information is recorded, wherein
   a leading frame of the access block is taken as a base point of decoding subsequent frames,
   access block size information for each access block and output-time information for a leading frame of each access block is recorded in the header area, and
   size information for frames other than the leading frame and output-time information for the frames other than the leading one is recorded along with each access block in the data area,
   the controlling means functioning to:
   read the access block size information for each access block and the output-time information for the leading frame of each access block, which is pre-recorded in the header area, before reading content information recorded in the data area and storing the access block size information and the output-time information into the storage means;
   identify, for reproducing the leading frame of the access block, the recording position of the reading frame on the basis of the access block size information for the access block and the output-time information for the leading frame of each access block, stored in the storage means; and
   read, for reproducing a frame other than the leading frame of the access block, the access block size information and the output-time information for the object frame from the data area of the recording medium on the basis of the access block size information for an access block including the object frame stored in the storage means to identify the recording position and output time of the object frame on the basis of the read access block size information and output-time information.

4. A recording method comprising the steps of:
   encoding an input content;
   dividing information resulting from encoding the input content into access blocks, each including a succession of frames of which a leading frame is taken as a base point of decoding subsequent frames;
   generating, for each access block, access block size information and output-time information for the leading frame;
   generating, for each access block, size information and output-time information for frames other than the leading frame;
   writing the content information in units of an access block into a contiguous data area of a recording medium;
   writing the access block size information for each access block and the output-time information for the leading frame into a contiguous header area of the recording medium; and
   writing size information and output-time information for frames other than the leading frame of each access block along with each access block into the data area.

5. A reproducing method of reproducing content information, in which content information is read from a recording medium and output, the recording medium including a contiguous data area in which content information is recorded in units of an access block including a succession of frames, and a contiguous header area in which header information for the content information is recorded, a leading frame of the access block being taken as a base point of decoding, access block size information for each access block and output-time information for the leading frame of each access block being recorded in the header area, size information for frames other than the leading frame and output-time information for the frames other than the leading one being recorded along with each access block in the data area, the method comprising:
   reading, by a medium drive, the access block size information for each access block and the output-time information for the leading frame of each access block, pre-recorded in the header area, before reading content information recorded in the data area and storing the access block size information and output-time information into a memory;
   identifying, for reproducing the leading frame of the access block, the recording position of the leading frame on the basis of the access block size information for the access block and the output-time information for the leading frame of each access block, stored in the memory; and
   reading, for reproducing an object frame other than the leading frame of the access block, the size information and the output-time information for the object frame from the data area of the recording medium by the medium drive on the basis of read access block size information for the access block including the object frame stored in the memory to identify a recording position and output time of the object frame on the basis of the read access block size information and output-time information.

* * * * *